Jan. 29, 1963  G. SALZMANN  3,075,427
FILM PRESSURE GUIDE FOR MOTION PICTURE CAMERAS
Filed April 23, 1962  3 Sheets-Sheet 1

INVENTOR
GERHARD SALZMANN
BY Toulmin E Toulmin
Attorneys

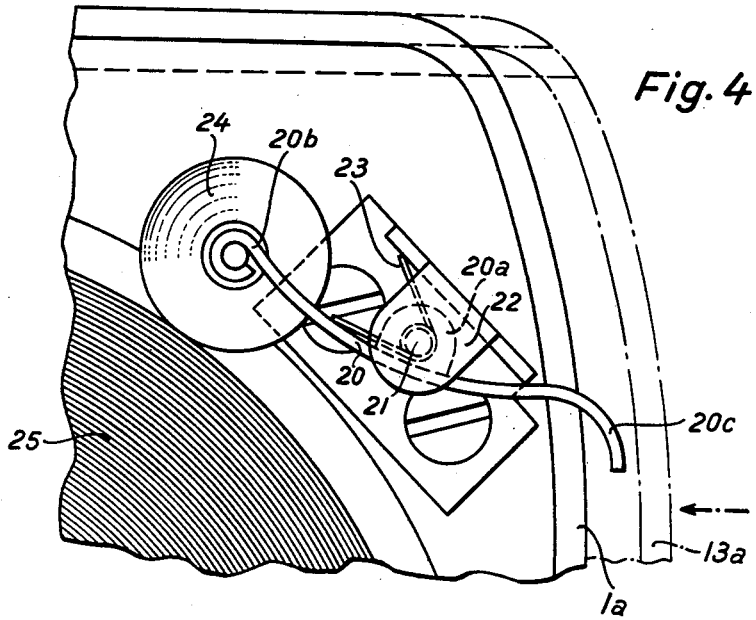
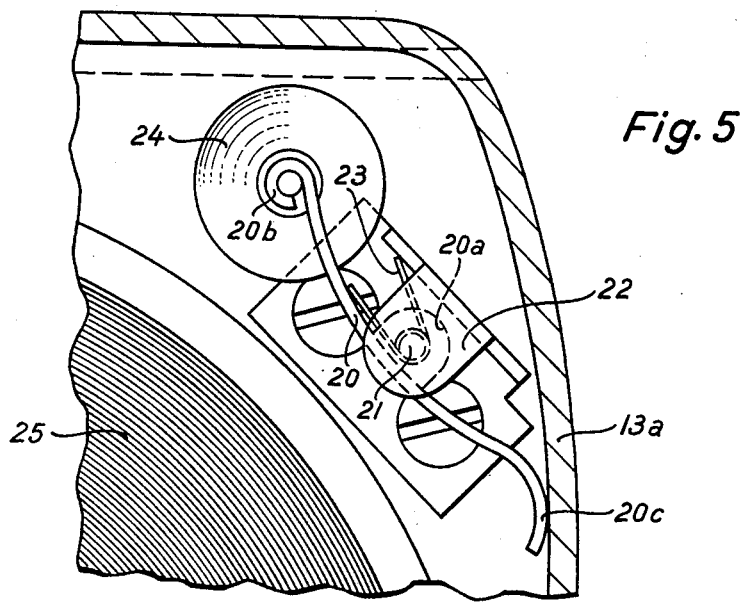

Jan. 29, 1963   G. SALZMANN   3,075,427
FILM PRESSURE GUIDE FOR MOTION PICTURE CAMERAS
Filed April 23, 1962   3 Sheets-Sheet 3

INVENTOR
GERHARD SALZMANN
BY
Toulmin & Toulmin
Attorneys

3,075,427
FILM PRESSURE GUIDE FOR MOTION PICTURE CAMERAS
Gerhard Salzmann, Wetzlar (Lahn), Germany, assignor to Ernst Leitz Gesellschaft mit beschrankter Haftung, Wetzlar (Lahn), Germany
Filed Apr. 23, 1962, Ser. No. 189,617
6 Claims. (Cl. 88—17)

The present invention relates to a film pressure guide engageable with a reel of film inserted into the film compartment of a camera, more particularly, to such a motion picture camera having interchangeable film reels therein wherein the guide member prevents film from unwinding from a full reel of film inserted into the film compartment while attaching the end of the film strip to the empty film reel.

A common problem occurring in the loading of motion picture cameras is that the beginning of the film on a full reel of film slips from the fingers of the person engaged in loading this reel of film into the film compartment. As a result, several of the outer turns of the film are loosened or actually are reeled off the reel. This is particularly the case when the end of the film strip has not yet been attached to the empty film reel in the film compartment. As a result of this inadvertent unwinding of the film from the full reel the film is exposed to light and is then not usable. In addition, occasionally substantial portions of the film on the new reel of film are exposed to light and thus made unusable.

It has been previously proposed to solve this problem by providing stationary pressure guides which extend between the flanges of the reel so as to engage the outer windings of the reel of film. These guide members are usually flexibly mounted to the camera casing so as to engage the reel of film irrespective of small differences in the diameter of the reel of film or are so mounted so as to be adjustable to various diameters of film reels.

These known arrangements have the disadvantage that, when exposing the first portions of the film, the pressure guide member resiliently slides on the reel of film. As a result, a retarding force acts upon the reel which is eliminated only after sufficient film has been exposed so that the diameter of the reel of film is reduced to the point where the reel of film can freely rotate without contacting the flexible pressure member.

Another disadvantage is that when the pressure guide member is urged against the reel of film with a strong resilient force, the entire reel of film may be pushed to one side of the reel and may extend outwardly of the outer peripheries of the reel flanges. In such an event light might impinge on this side of the film reel between the individual windings thereof in case the camera casing is opened.

It is therefore the principal object of the present invention to provide a novel and improved film presure guide arrangement for newly inserted reels of film.

It is another object of the present invention to provide a film pressure guide arrangement which engages the film only when the film compartment cover is opened.

The present invention essentially comprises a pressure guide member which is pivotally mounted within the film compartment of a camera. There is a spring biassing the guide into engagement with the newly inserted reel of film when the cover for the film compartment is opened. An arm extends from the guide member and is engageable with a portion of the film compartment cover when the cover is in the closed position. When the cover is in the closed position, it acts upon this arm to pivot the guide member from engagement with the reel of film.

With this arrangement the pressure guide member engages the reel of film only during the actual loading operation when the film compartment cover is open. As soon as the cover has been closed, the pressure guide is disengaged from the film and the film can be exposed in a normal manner without any forces retarding the rotation of the newly inserted reel of film.

Other objects and advantages of the present invention will be apparent upon reference to the accompanying description when taken in conjunction with the following drawings, wherein FIGURE 1 is a side elevational view of the film compartment of a motion picture camera with the cover removed and showing the pressure guide member in engagement with a reel of film;

FIGURE 4 is an elevational view of a portion of a film compartment with the cover removed and showing a further modification of the pressure guide arrangement;

FIGURE 5 is a view similar to that of FIGURE 3 but with the cover in the closed position and the pressure guide disengaged from the reel of film.

Figure 1:
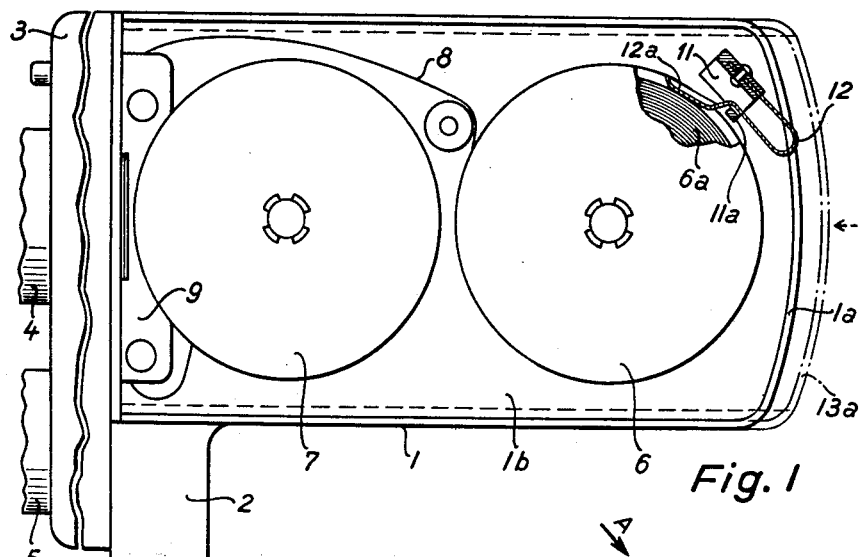

Proceeding next to the drawings, wherein like reference symbols indicate the same parts throughout the various views, the motion picture camera illustrated in FIGURE 1 comprises a casing 1 which houses the film compartment for the film reels. There is a hand grip 2 extending from the casing 1 and there is a front plate 3 on said casing 1. There is a photographic field lens 4 on the front plate 3 together with an optical system 5 for receiving light for the light meter.

With the cover being removed from the film compartment, there is shown therein a full reel of film 6 and an empty reel of film 7 upon which the film strip 8 is wound after being passed through the film gate 9 wherein it is exposed.

Mounted in the film compartment and adjacent to the film reel 6 is a supporting bracket 11 to which is fixedly mounted one end of a U-shaped flat spring 12. The bracket 11 is also provided with an abutment or stop member 11a against which the loose or free end of the flat spring 12 may rest when the spring is not under tension.

The film compartment is enclosed by a cover 13 which is slidably mounted for movement parallel to the optical axis of the camera in a direction of the arrow. The cover has a rear wall 13a which coincides with the wall 1a of the casing 1 when the cover is in the closed position (see FIGURES 1 and 3).

The free end of the U-shaped flat spring 12, which is engageable with the film 6a on the reel 6, is constructed as a pressure guide member 12a which extends between the flanges of the reel 6 when the film compartment cover 13 is removed. Thus, as may be seen in FIGURE 1, the pressure guide member 12a engages the outer turn of the reel of film 6a when the new reel of film is being inserted into the film compartment.

Figure 3:
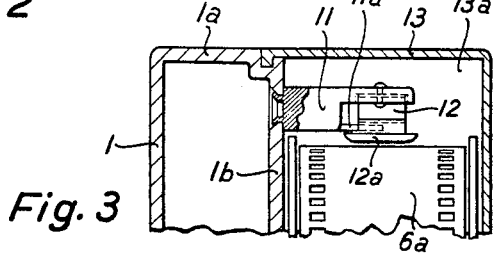
FIGURE 3 is a sectional view of a portion of the structure shown in FIGURE 2 viewed in the direction indicated by the arrow A.

The pressure guide member 12a is constructed as a segment of a sphere or curved, as may be seen in FIGURE 3, so that when a new reel of film is placed upon the axis of the reel 6, the outer edges of the reel will cam the pressure guide member 12a outwardly to enable the reel to be positioned upon the shaft. In the same manner, when the reel 6 is empty, the pressure guide member will be urged outwardly by the outer periphery of the reel acting upon the curved surface of the pressure guide member. As a result, no special manual operation is required by the user of the camera for pushing back the pressure guide member whenever the reels are being changed.

Figure 2:
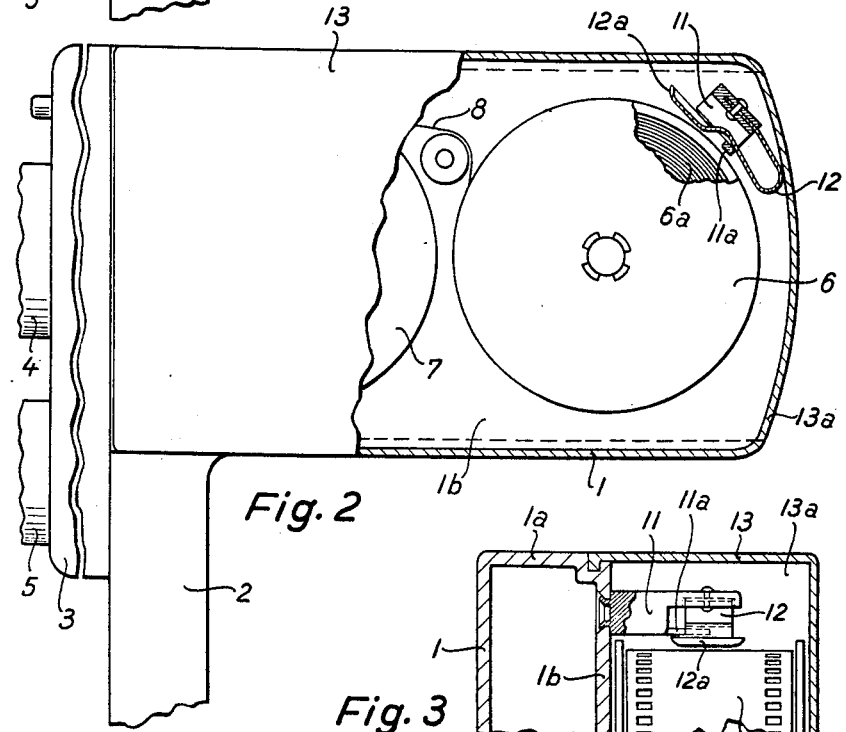
FIGURE 2 is a view similar to that of FIGURE 1 but with the film compartment cover in position and the pressure guide member disengaged from the reel of film.

The U-shaped flat spring 12 is so mounted in the camera that the closed end thereof projects beyond the side wall 1a of the casing when the film compartment cover 13 is removed, as may be seen in FIGURE 1. Thus, when the cover is mounted on the film compartment by sliding movement in the direction of the arrow, the cover wall 13a will engage the closed end of the flat spring 12 and pivot the spring into the position as shown in FIGURE 2, wherein the pressure guide member 12a is removed from contact from the outer turn of the reel of film 6a. Since this disengagement of the pressure guide member 12a from the reel of film 6a takes place immediately after the insertion of the new reel of film and prior to actually running the film through the film gate, it can be seen that there is no pressure on the reel of film during the actual operation of the camera. Thus, the film is freely running from the new reel of film 6a when the first frames of the film are being exposed.

Proceeding next to FIGURES 4 and 5, there is illustrated another modication of this invention wherein the pressure guide member is mounted on one end of a lever which is spring-biased. This modification comprises a two-armed lever 20 having two projecting brackets 20a which are pivotally mounted about a pin 21 which, in turn, is mounted in a fixedly positioned U-shaped base 22. There is a spring 23 mounted upon the pin 21 and urging the end 20b of the lever 20 in the direction of the film reel. A pressure guide member in the form of a roll 24 or a substantially spherical-shaped member is positioned on the end 20b and is engageable with a reel of film 25 which corresponds to the reel of film 6 in FIGURE 1. The section of the pressure roll 24 is substantially similar to that of the pressure guide member 12a so that the pressure guide member 24 may be easily pushed out of the way by the outer edges of the reel when the reel is either being positioned or removed from its shaft.

The other end 20c of the lever 20 extends into a space normally occupied by the rear wall 13a of the film compartment cover 13. Thus, when the cover is removed, as shown in FIGURE 4, the spring 23 biases the lever in the counter-clockwise direction so that the pressure guide roll 24 engages the outer turn of the reel of film 25. However, when the film compartment cover is positioned in the closed position, as shown in FIGURE 5, the rear wall 13a acts against the lever arm 20c to pivot the lever 20 in a clockwise direction and to disengage the guide member 24 from the reel of film.

Figure 6A:
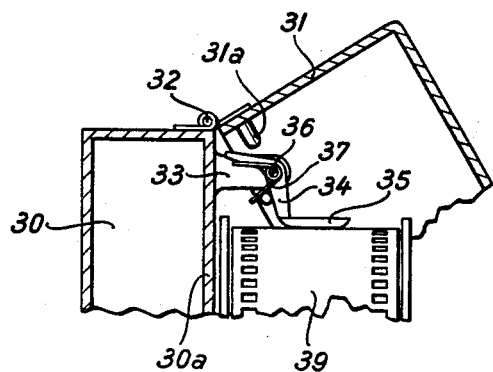
FIGURES 6a and 6b are transverse sectional views of a portion of the film compartment of a motion picture camera showing another modification of the pressure guide arrangement adapted for use with a pivotally mounted film compartment cover.
Figure 6B:
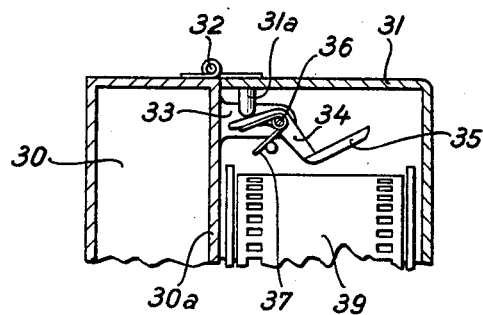

The modification illustrated in FIGURES 6a and 6b is particularly adapted for use in a camera having a pivotally mounted film compartment cover. The casing of the camera is indicated at 30 and a film compartment cover 31 is pivotally mounted on a hinge 32. The wall 30a of the camera casing is provided with a supporting bracket 33 upon which there is pivotally mounted an angular lever 34 having a pressure guide member 35. The lever 34 is pivotally mounted about a shaft 36 and a spring 37 is provided to bias the lever 34 in the clockwise direction.

When the film compartment cover 31 is pivoted to the opened position, as shown in FIGURE 6a, the spring 37 biasses the angular lever 34 so that the pressure guide member 35 engages the outer surface of the reel of film 39. Thus, the full reel of film is secured by the pressure guide member 35 during the loading operation. Upon closing the film compartment cover 31, a cam 31a mounted on the inner wall of the cover 31 engages the end of the lever 34 to pivot the lever in a counter-clockwise direction and thus to lift the pressure guide member 35 from contact from the reel of film 39. This position is shown in FIGURE 6b.

Thus it can be seen that the present invention discloses a simple, yet effective arrangement for retaining the film on a new reel of film in a tightly wound position during the operation of interchanging the reels of film. When the interchanging operation is terminated, the film compartment cover is closed. The relationship between the pressure guide member and the film compartment cover is such that upon closing of this cover the pressure guide member is disengaged from the outer winding of the reel of film. Thus, the full reel of film is able to rotate freely as soon as the motion picture camera is operated.

It will be understood that this invention is susceptible to modification in order to adapt it to different usages and conditions and, accordingly, it is desired to comprehend such modifications within this invention as may fall within the scope of the appended claims.

What is claimed as this invention is:

1. A film pressure guide arrangement for reels of film inserted in the film compartment of a motion picture camera, and comprising a guide member pivotally mounted in the film compartment of a motion picture camera and engageable with the outer surface of a full reel of film inserted in the film compartment, spring means urging said guide member into contact with the outer surface of a full reel of film when the film compartment cover is removed, and an arm extending from said guide member and engageable by a portion of the cover for the film compartment when the cover is in the closed position to move said guide from contact with said reel of film.

2. A film pressure guide arrangement for reels of film inserted in the film compartment of a motion picture camera, and comprising a guide member pivotally mounted in the film compartment of a motion picture camera and engageable with the outer surface of a full reel of film inserted in the film compartment, a cover for the film compartment and slidably mounted for movement parallel to the optical axis of the camera, spring means urging said guide member into contact with the outer surface of a full reel of film when the film compartment cover is removed, and an arm extending from said guide member and engageable by the rear wall of the film compartment cover when the cover is in the closed position to move said guide out of contact from said reel of film.

3. A film pressure guide arrangement for reels of film inserted in the film compartment of a motion picture camera, and comprising a guide member pivotally mounted in the film compartment of a motion picture camera and engageable with the outer surface of a full reel of film inserted in the film compartment, a cover for the film compartment and hingedly mounted for pivotal movement transversely to the optical axis of the camera, a cam on the interior of said cover, spring means urging said guide member into contact with the outer surface of a reel of film when the film compartment cover is pivoted to the open position, and an arm extending from said guide member and engageable by said cam when the cover is pivoted to the closed position to move said guide from contact with said reel of film.

4. A film pressure guide arrangement for reels of film inserted in the film compartment of a motion picture camera, and comprising a U-shaped flat spring with one end thereof being fixedly mounted in the film compartment of the camera casing, a guide member on the other free end of said spring and urged into engagement with the outer surface of a full reel of film inserted into the film compartment when the film compartment cover is in the open position, the closed end of said spring being engageable by a portion of the film compartment cover when the cover is in the closed position to move said guide member from contact with said reel of film.

5. A film pressure guide arrangement for reels of film inserted in the film compartment of a motion picture camera, and comprising a lever pivotally mounted within the film compartment of a motion picture camera, a pressure guide member on one end of said lever and engageable with the outer surface of a reel of film inserted into the film compartment, the other end of said lever extending into a space occupied by a portion of the film compartment cover when the cover is in the closed position, and spring means urging said one end of said lever into the direction of the film reel so that the guide member engages a reel of film when the film compartment cover is opened.

6. A film pressure guide arrangement as claimed in claim 5 wherein said pressure guide member comprises a roll rotatably mounted on one end of said lever.

References Cited in the file of this patent

UNITED STATES PATENTS

| | | |
|---|---|---|
| 1,921,560 | Case | Aug. 8, 1933 |
| 2,028,608 | Howell | Jan. 21, 1936 |
| 2,353,044 | Kriegsheim | July 4, 1944 |